(12) United States Patent
Liu et al.

(10) Patent No.: US 9,114,350 B2
(45) Date of Patent: Aug. 25, 2015

(54) APPARATUS AND METHODS FOR REGENERATION OF PRECIPITATING SOLVENT

(71) Applicant: The Southern Company, Birmingham, AL (US)

(72) Inventors: Guohai Liu, Birmingham, AL (US); Pannalal Vimalchand, Birmingham, AL (US); WanWang Peng, Birmingham, AL (US); Alexander Bonsu, Birmingham, AL (US)

(73) Assignee: SOUTHERN COMPANY, Birmingham, AL (US)

( * ) Notice: Subject to any disclaimer, the term of this patent is extended or adjusted under 35 U.S.C. 154(b) by 278 days.

(21) Appl. No.: 13/712,491

(22) Filed: Dec. 12, 2012

(65) Prior Publication Data
US 2013/0145934 A1 Jun. 13, 2013

Related U.S. Application Data

(60) Provisional application No. 61/569,856, filed on Dec. 13, 2011.

(51) Int. Cl.
*B01D 53/14* (2006.01)
*B01D 53/18* (2006.01)
*B01D 53/62* (2006.01)
(Continued)

(52) U.S. Cl.
CPC ........ *B01D 53/1425* (2013.01); *B01D 53/1475* (2013.01); *B01D 53/18* (2013.01);
(Continued)

(58) Field of Classification Search
CPC ........... B01D 53/1425; B01D 53/1475; B01D 53/18; B01D 53/62; B01D 53/96; B01D 2257/504; B01D 2258/0283; Y02C 10/04; Y02C 10/06
See application file for complete search history.

(56) References Cited

U.S. PATENT DOCUMENTS

| 2,944,966 | A | * | 7/1960 | Eickmeyer | 208/352 |
| 2005/0132883 | A1 | * | 6/2005 | Su et al. | 95/235 |

(Continued)

FOREIGN PATENT DOCUMENTS

| DE | 331993 | 3/1984 |
| WO | 2006136016 | 12/2006 |

OTHER PUBLICATIONS

International Search Report and Written Opinion dated Apr. 8, 2013 for related PCT patent application PCT/US2012/069204.

*Primary Examiner* — Duane Smith
*Assistant Examiner* — Cabrena Holecek
(74) *Attorney, Agent, or Firm* — Troutman Sanders LLP; Ryan A. Schneider; Dustin B. Weeks

(57) ABSTRACT

A regenerator that can handle rich loaded chemical solvent containing precipitated absorption reaction products is disclosed. The invention is particularly suitable for separating $CO_2$ from large gas streams that are typical of power plant processes. The internally circulating liquid stream in the regenerator (ICLS regenerator) rapidly heats-up the in-coming rich solvent stream in a downcomer standpipe as well as decreases the overall concentration of $CO_2$ in the mixed stream. Both these actions lead to dissolution of precipitates. Any remaining precipitate further dissolves as heat is transferred to the mixed solution with an inverted bayonet tube heat exchanger in the riser portion of the regenerator. The evolving $CO_2$ bubbles in the riser portion of the regenerator lead to substantial gas hold-up and the large density difference between the solutions in the downcomer standpipe and riser portions promotes internal circulation of the liquid stream in the regenerator. As minor amounts of solvent components present in the exit gas stream are condensed and returned back to the regenerator, pure $CO_2$ gas stream exits the disclosed regenerator and condenser system.

20 Claims, 4 Drawing Sheets

(51) Int. Cl.
*B01D 53/96* (2006.01)

(52) U.S. Cl.
CPC ............... *B01D 53/62* (2013.01); *B01D 53/96* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

2009/0152209 A1\* 6/2009 Agrawal ..................... 210/758
2010/0229723 A1\* 9/2010 Gelowitz et al. ............... 95/162

\* cited by examiner

APPARATUS AND METHODS FOR REGENERATION OF PRECIPITATING SOLVENT

CROSS-REFERENCE TO RELATED APPLICATIONS

This application claims the benefit of U.S. Provisional Application No. 61/569,856 filed 13 Dec. 2011, the entire contents and substance of which are hereby incorporated by reference.

STATEMENT REGARDING FEDERALLY SPONSORED RESEARCH OR DEVELOPMENT

This invention was made with Government support under Agreement/Contract Number DE-NT0000749, awarded by the United States Department of Energy. The Government has certain rights in the invention.

BACKGROUND OF THE INVENTION

1. Field of Invention

This invention relates generally to the use of species removal media for efficient removal of large quantities of an unwanted species from a process stream containing the unwanted species, and the subsequent regeneration of at least a portion of the species removal media for its reuse for further unwanted species removal. The species removal media can be a precipitating chemical solvent and can be used for efficient removal of large quantities of $CO_2$ from a process stream, and the subsequent regeneration of the chemical solvent with precipitates so that it could be reused for further $CO_2$ removal. Specifically, the present invention is a unique regenerator and a novel process for efficient handling and regeneration of $CO_2$-rich chemical solvents that contain precipitated reaction products from absorber.

2. Background and Related Art

Many chemical production processes utilize regenerable chemical solvents to remove acid gases from product streams or other process streams. For example, the essential components of a process for acid gas removal includes two reactors: an absorber and a regenerator. The acid gas in the process stream is absorbed into the chemical solvent in the absorber and is desorbed from the solvent in the regenerator. The regenerated solvent is recycled back to the absorber for reuse, and therefore, the solvent is called a regenerable chemical solvent.

Such use of regenerable chemical solvents is being adopted for capture and sequestration of carbon dioxide from power plant flue gases. Also, $CO_2$ capture is being realized using regenerable chemical solvents in precombustion processes such as the integrated gasification combined cycle (IGCC) process for power generation. Typically, such traditional chemical solvents are regenerated for reuse utilizing steam as a stripping agent and as a source of heat for the endothermic chemical reactions. Yet, while effective, such regeneration systems for $CO_2$ capture are energy intensive.

Many different species removal media exist to remove acid gases from process streams, for example, chemical solvent processes disclosed in "Gas Purification" by Kohl and Nielsen (Gulf Publishing, 1997). Among them, acid gases are most typically removed using aqueous amines. The methyl diethanol amine (MDEA) in various formulations is the most widely used chemical solvent in the natural gas, refinery gas and synthesis gas industries. A reformulated amine based solvent absorbs $CO_2$ via various chemical reactions producing a rich chemical solvent that is then regenerated at a higher temperature. As used herein, the relative terms 'lean' and 'rich' reflect the state of the species removal media with, for example, low and high concentrations of $CO_2$.

Unlike typical acid gases such as $H_2S$ targeted for removal in the IGCC process, $CO_2$ is present in much larger quantities. The $H_2S$ in the syngas is typically in ppm levels at the inlet of the acid gas removal unit, whereas $CO_2$ concentrations in fully shifted syngas is typically up to 25 mole percent from air blown gasification, and up to 40 mole percent from oxygen blown gasification. The flue gas from a pulverized coal (PC) combustion plant also contains large quantities of $CO_2$, typically in the approximately 12 to 15% range. Further, the volume of the flue gas from a power plant is large—an 880 MWe coal-burning plant can generate flue gas at a rate of more than 120 million ft3/hr.

As the absorption capacity of any given solvent is essentially constant, and large quantities of $CO_2$ needs to be separated from the syngas or flue gas, the quantity of chemical solvent that needs to be circulated between the absorber and regenerator also is proportionally high. With conventional technology, such high solvent flow rates between the absorber and regenerator would require large amounts of regeneration energy to break the chemical bond between the $CO_2$ and solvent molecules to regenerate the solvent. In addition, water used to form the solvent would be heated up in the regeneration process, requiring additional energy consumption. Thus, the conventional acid gas removal processes using conventional solvents become uneconomical for $CO_2$ removal from power plant processes due to vast regeneration energy requirements.

The absorption and regeneration apparatus for conventional reformulated chemical solvent processes for acid gas removal comprises tray or packed towers. These towers, especially towers with structured packing, are widely used in the process gas industries as their operation and performance are well characterized. However, the tray and packed towers are prone to plugging if precipitates or solids are present in the solvent. The process is designed and operated at conditions to limit if not avoid forming precipitates during absorption process. In case precipitate formation, the conventional process can include solvent filters to filter out solids that may be present in the solvent circulating around the loop between the absorber tower and the regenerator tower. Yet, the prevalent use of such an apparatus limits the use of solvents to non-precipitating chemical solvents.

The effectiveness of a particular species removal media comprising an aqueous chemical solvent to minimize energy consumption depends upon the concentration of the active absorbing component in the solvent. For example, due to the highly corrosive nature of monoethanol amine (MEA), MEA systems are typically operated at a low concentration of about 15 to 30 wt % MEA in water compared to reformulated MDEA solvent that can be up to 50 wt %. As the solvents need to be heated for regeneration, MEA solvent requires more energy to heat up the large quantity of water in the solvent. Additionally, the low concentration of amine in MEA system leads to higher solvent circulation rates between the absorber and regenerator, leading to more regeneration energy consumption.

The effectiveness of an aqueous chemical solvent is also determined by the extent to which the active absorbing component is utilized. Full utilization of the active component will lead to lower solvent circulation rates between the absorber and the regenerator, and consequently lower regeneration energy consumption.

Absorption of $CO_2$ using aqueous ammonia solvent in pre-combustion IGCC or PC combustion process leads to the formation of ammonium carbonate (one mole of $CO_2$ absorbed per mole of ammonia). Complete utilization of solvent is realized with further absorption of $CO_2$ leading to the formation of ammonium bicarbonate (two moles of $CO_2$ absorbed per mole of ammonia). With its attendant limited solubility, ammonium bicarbonate precipitates out. As used herein, the terms precipitated 'salts' and 'crystals' are used interchangeably, with both the terms referring to suspended solids in the solvent solution. If the absorber and regenerator are capable of handling precipitated solutions, lower regeneration energy consumption can be realized when the solvent is fully utilized. U.S. Patent Publication No. 2012/0216680, which is herein incorporated by reference, discloses a circulating dispersed bubble absorber that is capable of handling precipitating solvents upon absorbing $CO_2$.

As with aqueous ammonia solvent, several amino acid salt solutions (solvents) produce precipitates upon absorbing $CO_2$, (Feron and ten Asbroek, Green House Gas Technology Conference, 2004. These chemical solvents are stable, highly reactive and require lower regeneration energies as precipitation leads to high $CO_2$ loadings. The challenge is to configure a suitable absorber and regenerator to handle precipitating solvents such as aqueous ammonia and amino acid salt solutions.

U.S. Patent Publication No. 2009/0081096 discloses the absorption of $CO_2$ from process gas in hydrated lime solvent to form insoluble calcium carbonate precipitates. The precipitates are separated from the solution and are sold or sequestered without regeneration. Due to practical difficulties, instead of regenerating the solvent from the precipitates, mined limestone is continuously calcined to form the hydrated lime solvent. Yes, such a one-use process of the hydrated lime solvent increases cost significantly without the full benefit of overall $CO_2$ capture, as the calcination process to produce solvent generates additional $CO_2$.

To overcome the operability, efficiency and cost issues mentioned above, an improved species removal media for the efficient removal of large quantities of an unwanted species from a process stream containing the unwanted species, and the subsequent regeneration of at least a portion of the species removal media for its reuse for further unwanted species removal is highly desirable. Further still, a process that can regenerate chemical solvents that contain precipitated salts that formed upon absorption of $CO_2$ from an IGCC or PC combustion process stream is highly desirable. It is the intention of the present invention to provide for such industrial needs.

BRIEF SUMMARY OF THE INVENTION

Briefly described, in a preferred form, the present invention comprises a system, method, and apparatus using species removal media for efficient removal of large quantities of an unwanted species from a process stream containing the unwanted species, and the subsequent regeneration of at least a portion of the species removal media for its reuse for further unwanted species removal. In an exemplary embodiment, the species removal media is a chemical solvent, and the chemical solvent contains precipitates.

In an exemplary embodiment, the present invention is a system for species removal media regeneration comprising a regenerator comprising: a process stream inlet for receiving a process stream with a rich concentration of unwanted species; a downcomer standpipe into which the inlet stream is directed; an internally circulating liquid stream of species removal media; a heat transfer system to facilitate the interaction of the process stream with a rich concentration of unwanted species and the internally circulating liquid stream of species removal media; an unwanted species stream outlet for removal from the regenerator of an unwanted species stream upon the interaction of the process stream with a rich concentration of unwanted species and the internally circulating liquid stream of species removal media; and a regenerated species removal media inlet for receiving a regenerated species removal media stream; and a condenser comprising: an unwanted species stream inlet for receiving the unwanted species stream from the regenerator; a separating system for separating the unwanted species stream into a concentrated unwanted species stream and the condensed species removal media stream; a concentrated unwanted species outlet for removal from the condenser of the concentrated unwanted species; and a condensed species removal media outlet for removal from the condenser of the condensed species removal media stream.

The heat transfer system can comprise a set of inverted bayonet tubes heated with a heat media, the heated set of inverted bayonet tubes transferring heat to the species removal media. The heat media can comprise stream.

The system can further comprise a regenerator temperature regulation system comprising a heat media flow control system, wherein in the heat transfer system, the heat media enters the regenerator in a heated vapor state, and exits the regenerator in a condensate state, the heat media flow control system controlling the flow rate of one or both of the heated vapor and condensate states of the heat media, which heat media flow control system provides regenerator temperature regulation.

The system can further comprise an overflow system for containing an overflow amount of the species removal media.

The process stream can comprise a warm rich unwanted species containing precipitates.

In another exemplary embodiment, the present invention is a system for species removal media regeneration comprising: an absorber; a regenerator comprising: a process stream inlet for receiving a process stream comprising warm rich unwanted species containing precipitates exiting the absorption apparatus and a recuperative heat exchanger; a downcomer standpipe column into which the inlet stream is directed; an internally circulating liquid stream of species removal media comprising chemical solvent; and a set of inverted bayonet tubes heated with a heat media, the heated set of inverted bayonet tubes transferring heat to the chemical solvent; an overflow system for recovering regenerated lean chemical solvent from an overflow arrangement and storing the regenerated chemical solvent in a lean chemical solvent surge tank; a cooling system to cool an exiting gas stream from the regenerator with the relatively cooler process stream from the absorber, wherein the exiting gas stream is formed upon the interaction of the process stream with a rich concentration of unwanted species and the internally circulating liquid stream of chemical solvent; and a condenser for capturing and recycling the chemical solvent back to the regenerator.

An inlet section of the regenerator can comprise an inline mixer to mix the relatively cooler process stream with the exiting gas stream from the regenerator to form a mixed process stream; a funnel-shaped device to direct the mixed process stream to the downcomer standpipe column; a mixing system in the lower part of the downcomer standpipe column to mix the mixed process stream with the internally circulating liquid stream of chemical solvent; and a pumping system for pumping liquid stream of chemical solvent into the downcomer for increased internal liquid circulation requiring long residence time in staged regenerators.

An upper overflow section of the regenerator can comprise an internal weir and a trough to collect regenerated chemical solvent overflowing the weir circumferentially.

The process stream can comprise unwanted species from a power plant effluent or syngas stream with a $CO_2$ concentration from about 15% to about 40%, and wherein upon mixing with the chemical solvent, precipitates are formed.

The condenser can comprises: a bubbling distributor; a cooling coil bundle imbedded in a bubbling condensate liquid medium; a cyclonic separator to separate entrained liquid droplets; and a dipleg condensate return to the regenerator with a sealing mechanism.

An upper portion of the funnel-shaped device can have apertures for the evolving exiting gas stream to exit the regenerator.

The condenser can recover the small portions of chemical solvent in the inlet stream and the vapor exiting the condenser is a substantially pure $CO_2$ gas stream.

In another exemplary embodiment, the present invention is a method for regenerating a chemical solvent containing precipitated salts comprising: mixing rich solvent with precipitated salts from an absorber with an internally circulating liquid stream (ICLS) of a regenerator, wherein the internally circulating liquid stream absorbs heat from inverted bayonet tubes to produce $CO_2$ rich bubbles in a riser portion of the regenerator; cooling the hot acidic vapors and condensing a portion of evaporated solvent and moisture with a solution of cold rich solvent from an absorber that flows to the regenerator; recovering evaporated solvent and moisture from the $CO_2$ stream exiting the regenerator in a condenser of bubbling liquid comprising of condensed solvent and water; and maintaining liquid stream level in the regenerator by withdrawing regenerated lean solvent through an overflow arrangement.

The internally circulating liquid stream to rich solvent flow rate ratio can be in the range of approximately 50 to approximately 100, and the mixing of these two streams rapidly heats the rich solvent to regenerator temperatures.

The heating up of the rich solution with precipitates with the internally circulating liquid stream can lead to dissolution of precipitates.

The mixing of a substantially larger portion of internally circulating liquid stream that has a substantially lower concentration of $CO_2$ with a substantially smaller portion of rich solvent can lower the overall $CO_2$ concentration and leads to substantial dissolution of precipitates.

The evolving $CO_2$ rich bubbles in the riser portion of the regenerator can substantially promote mixing and heat and mass transfer. Further, the evolving $CO_2$ bubbles in the riser portion of the regenerator can lead to substantial gas hold-up, which in turn leads to substantially lower density in reference to liquid with no bubbles in a downcomer standpipe of the regenerator.

The substantial differences in densities of fluid in a downcomer standpipe and riser portions of the regenerator can lead to substantially high internal circulation rates of fluid in the range of approximately 200 to approximately 400 $lb/ft^2$-s.

For solvents with slower regeneration kinetics and exhibiting lower $CO_2$ evolution rates and lower density difference between a downcomer standpipe and riser portions with consequent lower internal fluid circulation rates, the riser portion of the regenerator can be operated with a temperature gradient in the range of approximately 5 to approximately 50° F. with subcooled steam condensate in an annular region of the inverted bayonet tubes.

The method can further comprise returning condensed solution from the condenser to the circulating liquid stream in the regenerator to maintain overall water and solvent balance.

The regenerated lean solvent exiting the regenerator, depending on chemical solvent characteristics, can be returned back to an absorber or further regenerated by conventional means to produce a substantially leaner solvent.

The high internal fluid circulation rates in the regenerator can lead to nearly uniform solution temperatures that can be uniformly lower for regeneration of solvents with faster regeneration kinetics and for higher temperature sensitive solvents.

In other exemplary embodiments, the present invention can comprise a system, method, and apparatus for regenerating a chemical solvent containing precipitated salts comprising a regenerator with an internally circulating liquid stream (ICLS), means for passing rich solvent with crystals from the absorption apparatus to a central column in the regenerator, and means for providing heat to the regenerator with inverted bayonet tubes; means for generating high internal liquid circulation rates with the release of $CO_2$ bubbles from the solvent due to rapid heat-up of freshly fed $CO_2$ rich solvent by partially regenerated solvent; means for creating a preferable temperature gradient in the vertical direction of the regenerator to efficiently regenerate solvent solutions with slower regeneration kinetics; means for recovering regenerated chemical solvent from upper overflow portion of regenerator, and means for storing regenerated solvent in a lean solvent surge tank; means for cooling vapors from the regenerator with a solution of cold rich solvent from the absorber; means for further cooling the vapors from the regenerator in an integrated bubbling condenser, and means for removing the heat from the condenser with cooling coil bundle imbedded in the bubbling liquid medium; means for regenerating the chemical solvent in multistage, means for withdrawing $CO_2$ from each stage and means for routing a portion of $CO_2$ rich gas from a high pressure second stage to a lower pressure first stage; and means for providing heat transfer surfaces to each stage of multiple stage regenerator.

In another exemplary embodiment, the present invention is a method for regenerating a chemical solvent containing precipitated salts comprising mixing rich solvent with precipitated salts from the absorber with internally circulating liquid stream (ICLS) of the regenerator to rapidly heat the rich solvent to regenerator temperature, and further absorbing heat from inverted bayonet tubes to produce $CO_2$ bubbles in the riser portion of the circulating system; cooling the hot acidic vapors along with condensing any evaporated solvent/water with a solution of cold rich solvent; recovering the evaporated solvent/water from the acidic vapor stream in a bubbling liquid comprising of condensed solvent/water; passing condensed solution back to the circulating liquid stream in the regenerator; operating multiple stages of regenerator at different process conditions; and recovering regenerated lean chemical solvent for further absorption.

As used herein the term 'ICLS regenerator' means a gas-liquid-salt contacting device wherein simultaneous dissolving, liquid phase reactions and mass exchange between liquid and gas (bubble) phases result in the regeneration of, for example, a $CO_2$ loaded rich chemical solvent.

As used herein the term 'chemical solvent' means a solvent that selectively removes an unwanted species from a stream containing the species, like $CO_2$ from a gaseous mixture by absorption with reaction with a chemical base present in the solvent.

As used herein the terms 'rich solvent' and 'lean solvent' mean the state of the solvent with respect to unwanted species concentration, for example, $CO_2$ concentration.

As used herein the term 'precipitating solvent' means a chemical solvent that upon absorbing appreciable amounts of the unwanted species, for example, $CO_2$, forms precipitates or crystals as the solubility of absorption reaction product is limited.

The present invention of regenerator capable of handling precipitated solids is ideal for rich $CO_2$ loaded solvents that exhibit high solution pressures at regeneration temperatures. It is also applicable for regenerating solvents with precipitated solids at low pressures whose high working capacity (difference in concentration of $CO_2$ in rich and lean solutions) is primarily due to precipitation in the absorber. The present invention is also applicable to amine based solvent systems in which the present invention can be used as a flash heat regenerator followed by conventional packed tower regeneration to minimize overall energy consumption.

The present regeneration system and methods provide for a single regenerator that can effectively regenerate at least 500,000 lbs/hr hour of unwanted species from the process stream, and/or operationally remove at least 90% of unwanted species from the process stream. In an exemplary embodiment, the present system can, with a single regenerator, effectively regenerate chemical solvents with or without precipitated absorption reaction products from absorption of at least 500,000 lbs/hr hour of $CO_2$, which can represent at least 90% of $CO_2$ from a typical 350 MWe power plant effluent or syngas stream. For larger power plants, multiple sets of disclosed regenerator system in parallel or a manifold network of distributed regeneration inside a single large regenerator vessel can be employed for regeneration of large volumes of rich chemical solvent from a system of absorbers.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
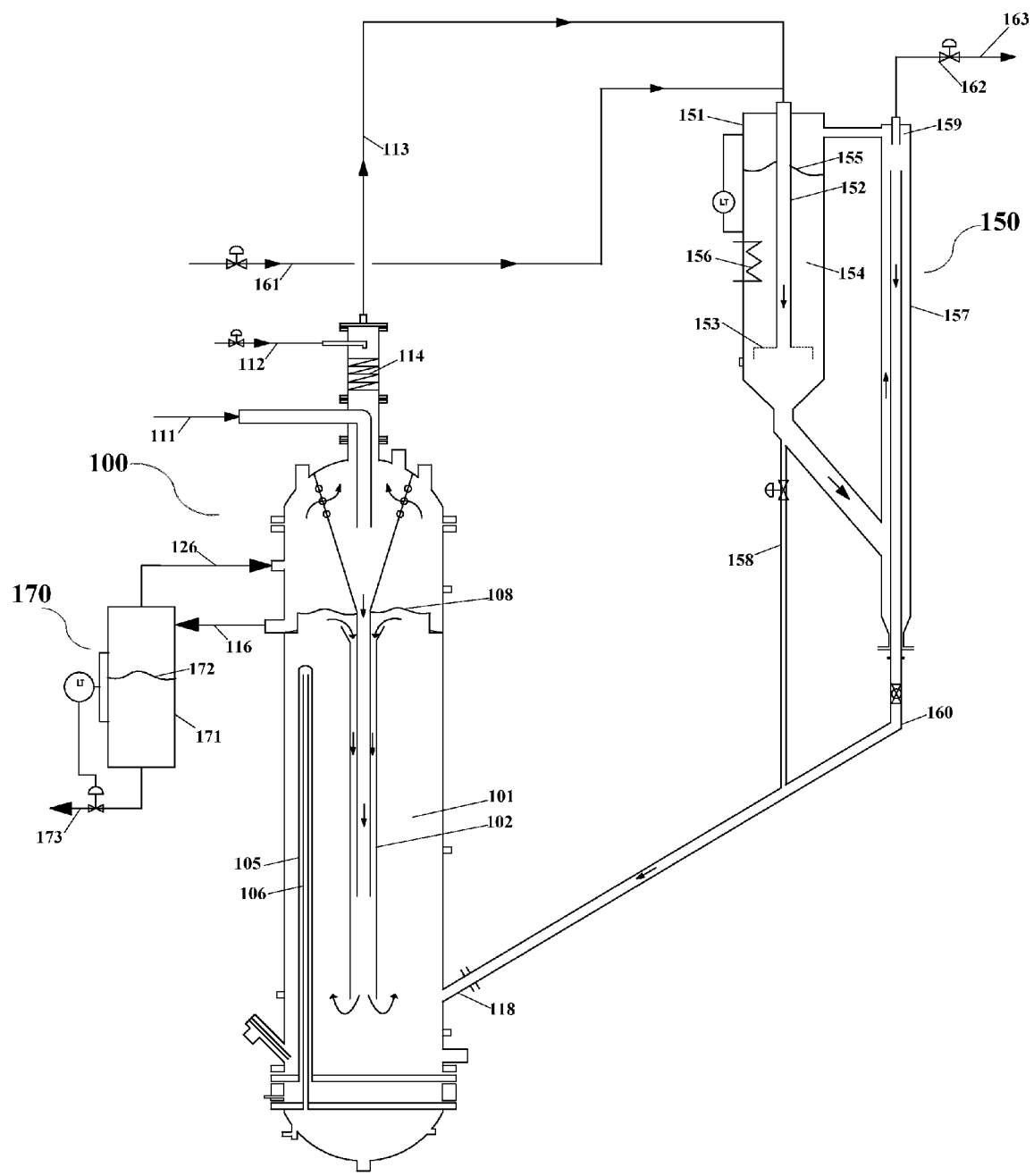
FIG. 1 is a schematic representation of integrated regenerator and condenser unit of the present invention according to a preferred embodiment for regenerating chemical solvents containing precipitated salts.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The invention comprises an arrangement as in FIG. 1 whereby chemical solvent with precipitated salt can be effectively regenerated to separate $CO_2$ from solution and produce a lean chemical solvent for further capture of $CO_2$ in the absorber from large processes including power plants. By employing a regeneration system that can handle suspended solids, the chemical solvent can be fully utilized by forming salt precipitates in the absorber and thereby maximizing the $CO_2$ loading of the solvent. The arrangement in FIG. 1 comprises of a regenerator 100, an integrated condenser unit 150 to condense solvent from the regenerator exit $CO_2$ stream and produce a high purity $CO_2$ stream 163 for sequestration or utilization and an overflow surge system 170 to return the regenerated lean solvent back to the absorber.

The rich solution 111 enters the regenerator 100 (FIG. 2) and is heated up to facilitate thermal regeneration. Saturated steam is used for heating using inverted bayonet tubes 105/106. Steam enters the bottom head through nozzle 121 and passes through the inner pipe 106 (supported by tubesheet 124) of the bayonet tubes. As the steam flows through the annular space between inner (106) and outer (105) pipes of the bayonet tubes, steam condenses along the inner surface of the outer pipe and thereby transferring heat to the solvent solution surrounding the outer pipe (105).

The outer pipes 105 of the bayonet tubes are supported by another tubesheet 125 and the steam condensate flowing down the inside surface of the outer pipe collects between the two tubesheets and exits as stream 122. Steam or condensate flow rate is modulated to maintain the regenerator at the desired temperature.

The rich $CO_2$ loaded solvent solution from the absorber normally passes through a heat recuperator (before entering the regenerator through stream 111 in FIG. 2) to recover heat from the lean solution returning back to the absorber. The rich $CO_2$ loaded solution has the option to either contact (with stream 112) with the hot $CO_2$ gas stream 107 evolving from the regenerator or flow directly (stream 111) into the regenerator through conduit 110 without direct contact with $CO_2$ gas stream 107. A portion of rich solution may bypass the heat recuperator and flow directly to top of the regenerator (stream 112) to quench the exiting $CO_2$ stream 107 through an in-line mixer 114. Some of the heat energy is recovered from the exiting hot gas stream from regenerator as it heats-up the rich solution entering the regenerator. The rich solution, as it is nearly saturated with $CO_2$, would not absorb $CO_2$ from the gas exiting the regenerator. As the exiting $CO_2$ stream is cooled by the relatively cooler rich solution stream 112, a portion of evaporated solvent components (water and ammonia in the case of aqueous ammonia based solvent system) condense and flow along with the rich solution into the regenerator downcomer standpipe.

In a preferred embodiment, the design of the inline mixer and the method of introduction of the rich solution into the mixer shall be such that the temperature difference between the $CO_2$ rich stream 113 (FIG. 2) flowing upwards and exiting the inline mixer and the rich solution stream 112 flowing downwards and exiting the inline mixer shall not be greater than 10 degrees Fahrenheit and preferably less than 5 degrees Fahrenheit to maximize energy efficiency of the system.

Figure 2:
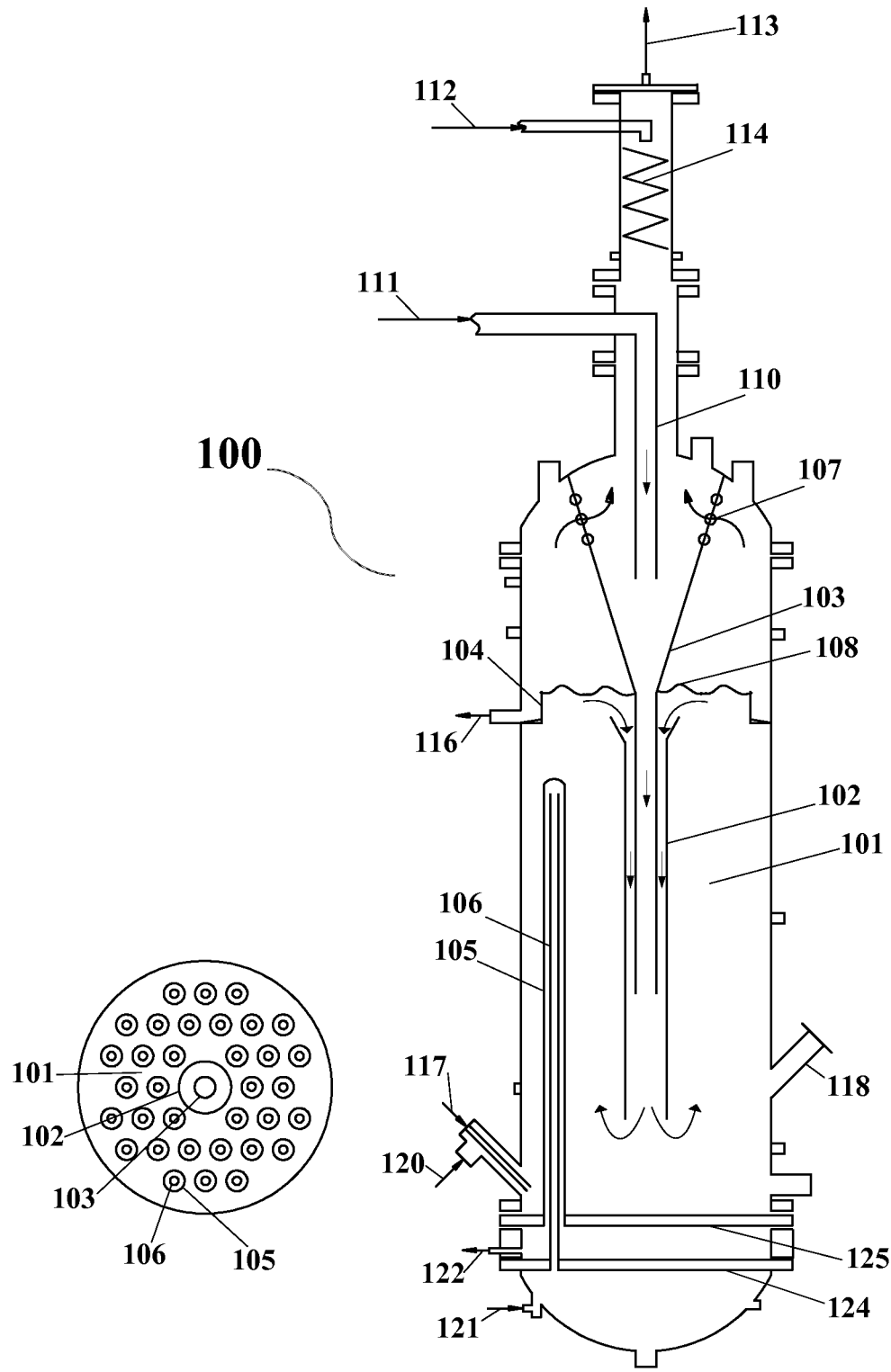
FIG. 2 is a schematic representation of details of regenerator unit of the present invention according to a preferred embodiment for regenerating chemical solvents containing precipitated salts.

The rich solution 111 or 112 entering the regenerator flows through a funnel-shaped section 103 into a central regenerator downcomer standpipe 102. The solution in the riser-side 101 of the regenerator surrounding the central downcomer standpipe 102 is heated by the outer surface of inverted bayonet tubes 105. The plan view in FIG. 2 shows an arrangement of bayonet tubes 105/106 in the riser portion 101 of the regenerator and around the central downcomer standpipe 102 and conduit 103 through which the rich solution stream 111/112 flows into the downcomer standpipe. $CO_2$-rich bubbles form on the outer surface of the bayonet tubes which tend to detach and rise through the riser solution.

The large number of evolving gas bubbles increases the gas hold-up in the solution on the riser-side 101 of the regenerator. The increased gas hold-up decreases the density of the riser-side solution. Due to differences in temperature and gas holdup leading to differences in solution density inside (downcomer standpipe-side) and outside (riser-side) the central column, a circulation loop will naturally form between the riser-side (liquid and gas stream flowing upwards) and downcomer standpipe-side (liquid stream flowing downwards). The circulating solution from the riser side overflows into the central downcomer standpipe 102 and the gas bubbles in the riser solution continues to rise to the top and detach at the gas-liquid interface 108. The solution flowing down the downcomer standpipe mixes with the rich solution flowing down through funnel stem 103 (FIG. 2). As there are no gas bubbles in the mixed solution flowing down the central downcomer standpipe, the density of the solution in the standpipe is higher than the surrounding riser-side solution. The liquid circulation rate can also be increased with higher jet velocity of the rich solution stream 111 or 112 flowing into the central downcomer standpipe 102.

As those skilled in the art can appreciate that the internal liquid circulation rate in the regenerator and therefore the liquid residence time in the regenerator can be adjusted by controlling the liquid inlet pressure or jet velocity. Furthermore, a novel characteristic of the invention deals with the internal liquid circulation rates which will be self-adjusting based on the extent of regeneration. When the rate of the solvent regeneration needs to be increased, the flow rate of rich solvent solution with precipitates through streams 111 or 112 to the downcomer standpipe 102 increases. The increased flow rate of rich solvent solution and the resulting increased jet velocity will induce higher internal liquid circulation flow to the downcomer standpipe. The increased flow rate of rich solvent solution will also result in increased generation of $CO_2$ rich bubbles in the riser-side 101 of the regenerator. As a result, the gas hold-up increases in the riser-side and so does the density difference between the downcomer standpipe 102 and the riser 101 portions of the ICLS regenerator. The increased density difference will increase the internal liquid circulation rate and with each circulation pass, the liquid will tend to move closer to equilibrium concentration at the operating temperature and pressure. On the other hand, when the flow rate of rich solvent solution with precipitates is decreased due to decreased absorption (for example, during partial load operation of an IGCC process), the internal circulation rate will be less with less evolution of $CO_2$ rich bubbles in the riser portion of the regenerator and the amount of energy consumed will also be less.

Gas hold-up in the riser-side of the ICLS regenerator will depend on operating parameters and properties of the chemical solvent. Generally, a chemical solvent with relatively low $CO_2$ equilibrium concentration at the operating temperature of the regenerator and high absorption capacity will release more $CO_2$ in the riser portion of the regenerator. The gas hold-up in the riser portion will be high and therefore the solvent internal circulation rate will be high. The operating pressure and temperature also have a major influence on internal liquid circulation rate.

The riser gas hold-up is between approximately 0.1 and 0.4 under normal circumstances. With such gas hold-ups, high internal circulation rates in the range of approximately 200 to 400 lb/sq ft-sec can be achieved. As the internal circulation rate is at least 50 to 100 times larger than the rate at which the rich solution stream 111 or 112 enters the regenerator central downcomer standpipe 102 (FIG. 2), the rich solution is heated-up at a rapid rate facilitating dissolution of precipitated salts in the solution due to higher temperature and dilution. Any remaining precipitated salts remain in suspension in the circulating solution and enter the riser side of the regenerator. As the solution is further heated by the inverted bayonet tubes located in the riser side of the regenerator, the salts dissolve and the solution forms $CO_2$ rich bubbles. No precipitated salts will accumulate on the tubesheet 125 as it is maintained warm at saturated steam conditions.

One skilled in the art can scale the regenerator system 100 in FIG. 2 with the addition of a number of downcomer standpipes and by maintaining a constant ratio of internal circulation rate to rich solution rate entering each downcomer standpipe. The rich solution stream 111 or 112 entering the regenerator can be distributed through a manifold of pipes to each downcomer standpipe in the scaled system.

As the internally circulating solution is heated up to the desired temperature in the riser portion 101 of the regenerator, $CO_2$ will be released in the form of bubbles from the solution. Due to high internal liquid circulation rates, the temperature throughout the riser portion of the regenerator is nearly uniform or a desired low temperature gradient can be realized depending on the heat-up steam 121 pressure, facilitating a high degree of regeneration without degrading the solvent due to high temperatures. The conventional packed bed regenerators are typically operated at higher regeneration temperatures in the lower portion of the tower in order to maintain a reasonably high temperature in the upper portions of the tower. Also, the solution has much longer residence times in the lower part of the tower where the heat transfer surfaces are generally located. Such high temperatures and longer residence times in the lower part of the conventional tower sometime irreversibly degrade the solvent, especially when a high temperature sensitive solvent is used.

The turbulence in solution moving up through the riser portion 101 of the regenerator limits or prevents accumulation of $CO_2$ rich bubbles on the bayonet tube outer surface 106 (FIG. 2). Also, the formation and movement of $CO_2$ rich bubbles along with high internal liquid circulation rates cause sufficient turbulence in the solution in the riser portion 101 of the regenerator 100, leading to good mixing with high heat and mass transfer rates. The bubbles in the solution on the riser side 101 are rich in $CO_2$ and they rise through the solution due to buoyancy and internally circulating liquid flowing upwards. The bubbles break at the gas-liquid interface 108 and the $CO_2$ released from the solution flows through the vent holes 107 in the funnel shape device 103 which directs the incoming rich $CO_2$ solution to the downcomer standpipe 102. The $CO_2$ rich gas stream 113 exits the regenerator and flows to a downstream condenser system 150 (FIG. 1).

One skilled in the art can also appreciate that the regenerator 100 arrangement outlined in FIG. 2 can minimize the solvent degradation for solvents that require long residence times. This advantage is partially derived from the use of inverted bayonet tube heat exchanger. The saturated or superheated steam will travel upwards through the inner tube 106 and the condensate will flow downward through the annular region between inner and outer tubes. The heat exchange occurs indirectly between the condensing steam inside the bayonet tubes and the solvent in the riser 101. The heat exchanger can be operated in two different ways. One way is to withdraw the condensate at the saturation temperature under the operating pressure of the steam. In this operation, the entire riser side of solvent will be uniform in temperature due to the high internal liquid circulation rates described earlier. This mode of operation is useful for vast majority of solvents that require short residence times for regeneration.

The inverted bayonet tube heat exchanger can also be operated by withdrawing the steam condensate from the annular region at a subcooled temperature, preferably 5-50 degrees Fahrenheit below the steam saturation temperature. This is achieved by lowering the steam and condensate stream 121 and 122 flow rates. In terms of temperature profile, the top portion of the bayonet tube will be hotter as it is in contact with steam while the lower portion of the bayonet tube will be at the lower subcooled condensate temperature. In addition, the heat transfer rate is generally much higher in the upper portion of the bayonet tubes where steam starts to condense. The combination of high steam temperature and high heat transfer rate will facilitate the upper section of the riser to operate at a relatively higher temperature with lower internal liquid circulation rates. Such a temperature gradient between the upper and lower sections of the riser is desirable for solvents that have slower regeneration kinetics. The $CO_2$ release rate for such solvents is naturally low and, therefore, the liquid circulation rate will also be relatively low. The mixture of injected rich solution and internally circulating liquid is gradually heated as it moves up the riser at a slower rate and such rates provide sufficient time for regeneration. As the highest temperature is in the upper region of the riser, the equilibrium partial pressure of $CO_2$ in the liquid in this region will be low and the solution overflowing the internal weir 104 will be lean in $CO_2$.

The solvent in the regenerator 100 (FIG. 2) overflows through an internal weir 104 which is designed to collect the regenerated lean solvent overflow circumferentially, facilitating regenerator operation at a constant liquid level 108. The collected lean solvent stream 116 exits the regenerator and flows to a surge system 170 (FIG. 1) which contains a surge vessel 171 in which the regenerated lean solvent level 172 is maintained. The lean solvent surge vessel 171 is also in fluid communication with the regenerator system 100 through a pressure balance line 126. Depending upon the type of the solvent such as the amino acid salt solution, the lean solvent 173 can be returned back to the absorber through a heat recuperator and a cooler. The lean solvent 173 can also be returned back to the absorber if the working capacity (difference in concentrations of $CO_2$ in rich and lean solutions) is in desired range. As the regenerated solvent stream 173 contains no precipitated solids, the $CO_2$ concentration in the regenerated solvent can further be reduced, if deep regeneration is desired, by conventional means with a packed column to attain maximum working capacity.

Figure 3:
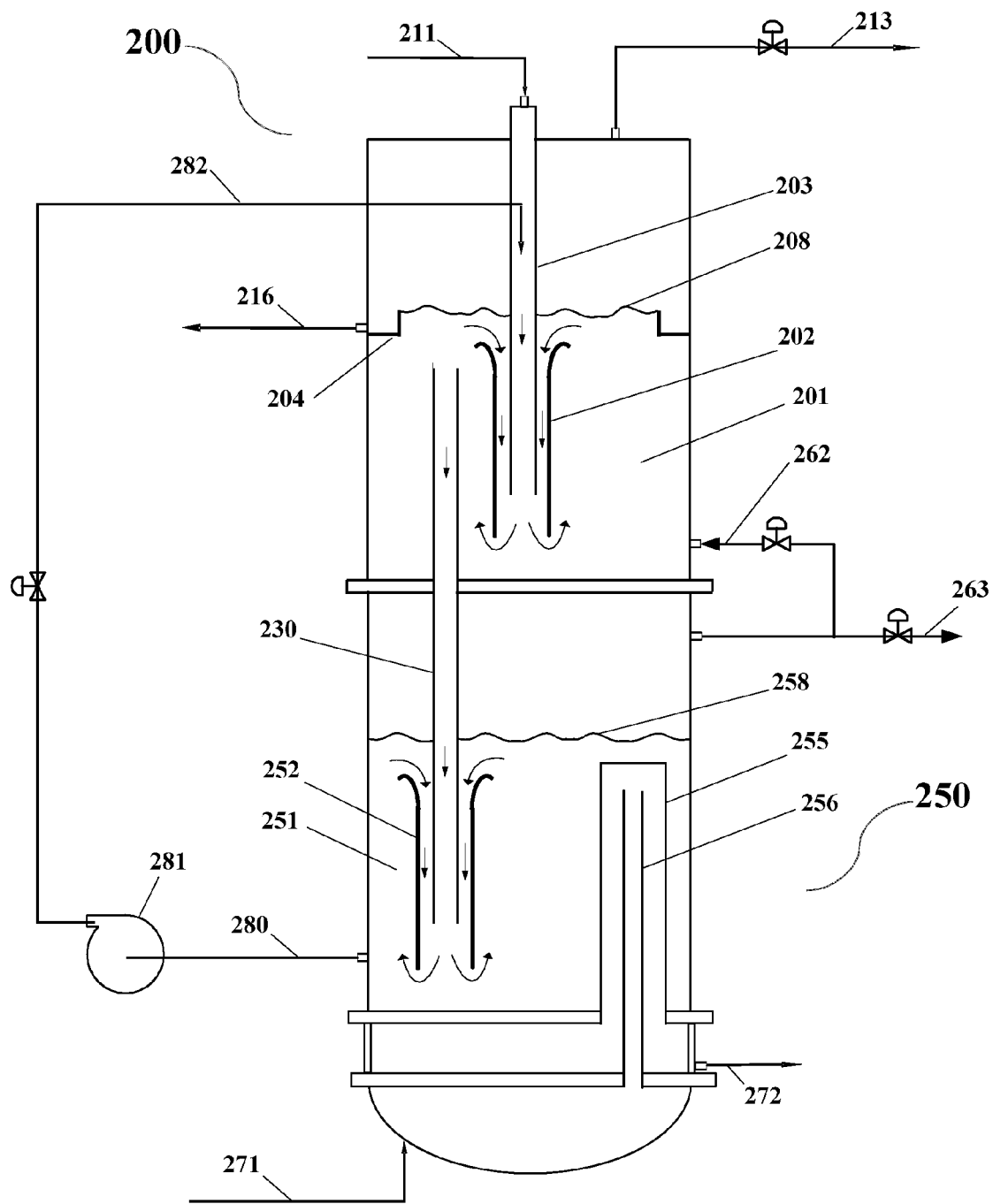
FIG. 3 is a schematic view of a two-stage regenerator of the present invention according to a preferred embodiment with a heating surface only in the bottom stage.

As part of another embodiment of the invention, the solvent regenerator can be operated as a multistage regenerator for those solvents with a high equilibrium concentration of the $CO_2$ in the liquid phase as shown schematically in FIG. 3. In this arrangement, a second stage is added. The two stages (200 and 250) will be operated at different temperatures and the top (first) stage 200 is at a relatively lower temperature and pressure compared to the bottom (second) stage 250. The liquid solvent solution flows from the top stage 200 to bottom stage 250 by gravity through an appropriately sized transfer pipe 230. The principle of operation of bottom stage 250 with internal liquid circulation through downcomer standpipe 252, heating of circulating solution through bayonet tube (255 and 256) heat transfer surfaces, and generation of $CO_2$ bubbles in the riser portion 251 of 250 is similar to that described in reference to regenerator system 100 shown in FIG. 2. The solution in bottom stage is typically heated with steam (271) through bayonet tubes and the condensate exits through stream 272.

A portion of hot solution (stream 280) from bottom second stage 250 is pumped (with pump 281) to top first stage 200. The hot solution stream 282 mixes with the rich solution stream 211 and flows through conduit 203 into the first stage downcomer standpipe 202. As the rich solution stream 211 is heated upon mixing with internally circulating hot solution, initial evolution of $CO_2$ bubbles occur in the riser portion 201 of first stage 200 and the $CO_2$ rich stream 213 exits the first stage. As the liquid in-flows to first stage 200 through streams 282 and 211 are higher than liquid outflow through transfer pipe 230, the liquid level in the first stage will be higher and overflow the circumferential internal weir and trough arrangement 204. The liquid levels 208 and 258 in the two stages are maintained by stream 216 outflow from the upper stage 200. The lean solution stream 216 flows back to the absorber through a surge system 170 as shown in FIG. 1.

Bulk of regeneration occurs in the high temperature bottom stage 250 and a portion 262 of the $CO_2$ stream 263 exiting 250 can be sent back to the top stage 200 of the regenerator for heat recuperation and to promote internal circulation. Those stilled in the art can extrapolate FIG. 3 to more stages if need be to regenerate the solvent. The exiting $CO_2$ rich gas streams 213 and 263 from the two stages can be merged into a single stream for further treatment. Backpressure control valves in the exiting $CO_2$ rich gas streams 213 and 263 facilitates operation of multistage regenerator at desired high pressures appropriate for solvent that is being regenerated.

Another embodiment of present invention is to regenerate $CO_2$ rich chemical solvents with precipitates with wide range of regeneration residence time requirements ranging from 1 second to an hour. For those rich chemical solvents that require long residence time, the solvent feed rate will be relatively low and the induction effect of feed solvent entering the downcomer standpipe 202 will disappear. Under such circumstance, the pump around loop with pump 281 as shown in FIG. 3 can be used to induce additional internal circulation in the regenerator.

The upper first stage 200 will operate at a lower temperature and the solvent will have a long residence time for solvents with slow regeneration kinetics. The solvent residence time in the upper first stage will be controlled by the liquid pump around rate (stream 282) and liquid feed rate (stream 211). Under steady operating conditions, with liquid levels 208 and 258 in the two stages maintained, the lean solution exiting the first stage regenerator through stream 216 will equal the rich solution stream 211 (on a $CO_2$-free basis) that enters the regenerator.

Figure 4:
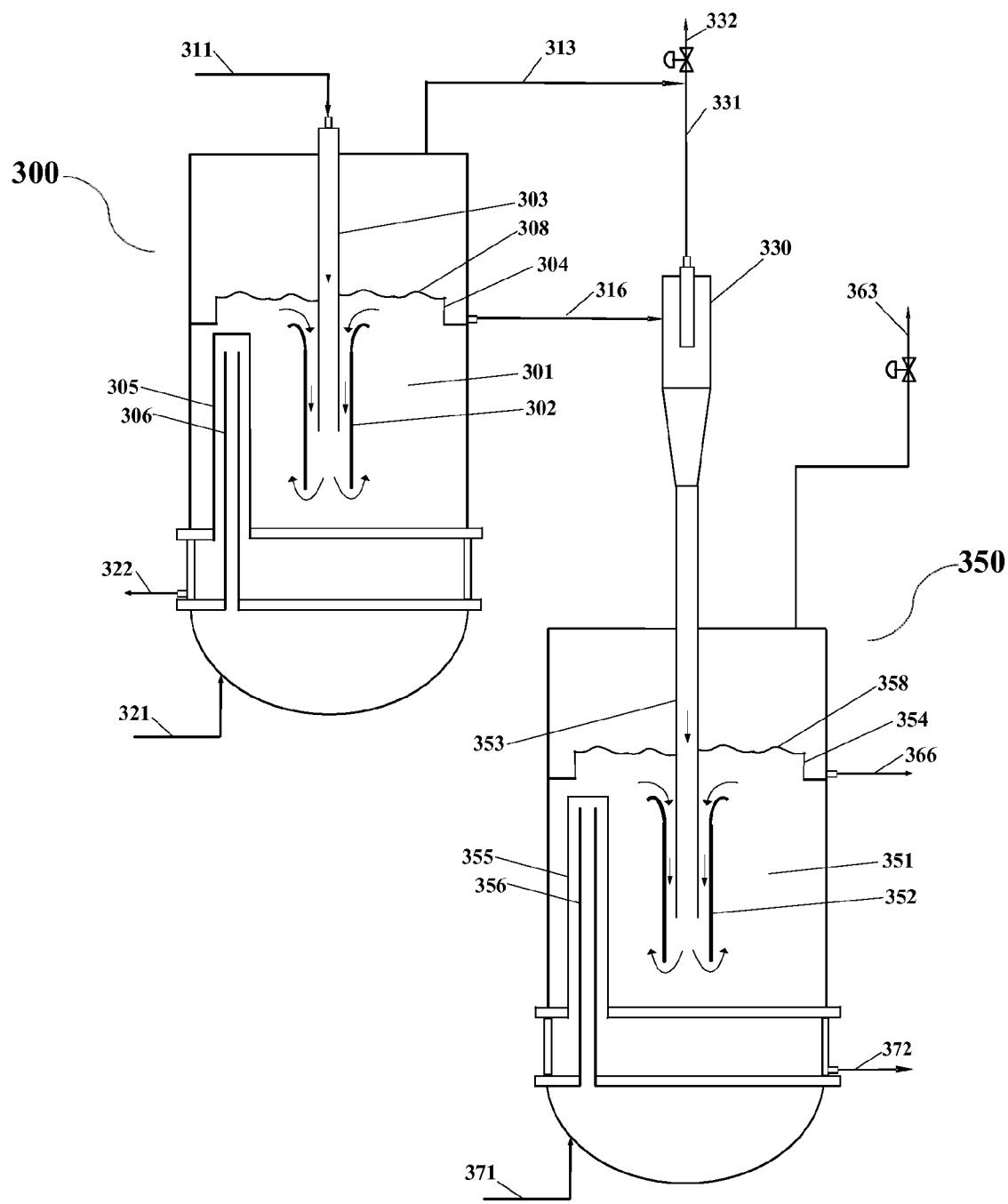
FIG. 4 is a schematic view of a two-stage regenerator of the present invention according to a preferred embodiment with both-stages having heat transfer areas to heat the solvent to different temperatures.

FIG. 4 shows another preferred embodiment of multistaging the ICLS regenerator. In this embodiment, both regenerator stages (300 and 350) can be heated independently to desired operating conditions with bayonet tube heat exchangers (305/306 and 355/356) with steam through streams 321 and 371 at different conditions and at varying condensate rates (322 and 372). Also, for chemical solvent that require long liquid residence time, a pump similar to the embodiment in FIG. 3 can be added to induce additional internal liquid circulation in both regenerator stages.

The rich solution with precipitates enters first stage regenerator 300 in FIG. 4 through stream 311 and flows through conduit 303 and mixes with the internally circulating stream in the downcomer standpipe 302, leading to dissolution of precipitates. As the solution level 308 is maintained in the regenerator, the circulating solution from the riser 301 overflows into the trough and circumferential internal weir arrangement 304. The solution stream 316 exiting the first stage regenerator 300 enters a cyclone 330 where the $CO_2$ rich gas stream 331 is separated from the liquid stream which continues to flow through conduit 353 to second stage regenerator system 350. As in first stage 300, the solution flowing through conduit 353 mixes with the internally circulating solution in the downcomer standpipe 352. As the circulating solution is heated with bayonet tube heating surfaces, $CO_2$ bubbles form in the riser portion 351. The principle of high liquid circulation rates in both stages 300 and 350 due to density differences between downcomer and riser portions and induction effect of entering liquid stream is similar to that described with system 100 in FIG. 2.

The internal circulation in each stage in FIG. 4 maintains sufficient liquid flow rate near the heating surfaces to avoid any local overheating and accumulation of any heat sensitive solids on the surface of the tubes. The rich $CO_2$ stream exits the two stages through streams 313, 331 and 363. Streams 313 and 331 are combined to form stream 332 and back-pressure in each stage is maintained through control valves in streams 332 and 363. As the solution level 358 is maintained in second stage regenerator system 350, the liquid overflows the trough and weir arrangement 354 and the lean liquid stream 366 exits the second stage and flows to the absorber through a surge system 170 as shown in FIG. 1. Although it is not shown in FIGS. 3 and 4, the exiting $CO_2$ rich vapor streams (213 and 263 in FIGS. 3 and 332 and 363 in FIG. 4) can be combined and subjected to further treatment including moisture condensation and recovery of volatile solvent with the integrated high pressure condensation system 150 shown in FIG. 1.

During operation start-up, $CO_2$ or an inert gas 117 as shown in FIG. 2 can be introduced into the lower portion of ICLS regenerator to promote internal liquid circulation and heat-up the solution in the regenerator to desired temperature. The regenerator presented in this invention can also be used effectively as a first-stage flash heat regenerator in conventional amine systems by introducing rich amine solution through stream 120 in the lower part of the regenerator or stream 111 (FIG. 2). Nagasaki et al., (Hitachi Review Vol. 59, No. 3, 2010, pp 77-82) have shown that flash heat regeneration followed by conventional packed column regeneration to produce a lean solvent increases the net efficiency of an IGCC power plant by about 4% for 90% $CO_2$ capture with an amine solvent.

The $CO_2$ stream 113 exiting the ICLS regenerator 100 flows to an integrated high pressure condenser system 150 (FIG. 1). For solvents such as aqueous ammonia solution, the condenser system is closely integrated with the ICLS regenerator to condense appreciable amounts of ammonia and evaporated moisture that exits the regenerator along with $CO_2$ stream 113. High pressure operation (above 200 psig) minimizes the ammonia and moisture content in the exiting $CO_2$ stream. For solvents such as amino acid salt solution, the exit stream predominantly comprises $CO_2$ with lower amounts of evaporated moisture from solution. For these solvents, the moisture is condensed in conventional condensers such as shell and tube heat exchanger or venturi scrubber. The condensed solution stream 160 from the condenser system 150 (FIG. 1) along with any make-up water introduced through stream 161 is returned back to the regenerator 100 through nozzle 118 located at the lower portion of the regenerator.

In condenser system 150 shown in FIG. 1, the exit $CO_2$ gas stream 113 from the regenerator containing a small fraction of solvent and moisture enters the condenser 151 and flows through a conduit 152 to a distributor 153. The distributor has several holes in the range of approximately 1/16 to 3/16 inch diameter. Gas bubbles that form at the distributor rises through the condensed solution 154. The condensed solution is maintained at a cooler temperature by means of cooling coils 156. As the bubbles rise through the cooled condensed solution 154, moisture and solvent condenses into the solution. As the condensate solution 154 is dilute in solvent, a small portion of $CO_2$ is also absorbed.

As with the ICLS regenerator 100, one skilled in the art can scale the system with the addition of a number of gas distributors within the condenser vessel 151 and maintaining a constant gas velocity, typically around 75 ft/s, through the distributor holes. The $CO_2$ stream 113 from the regenerator 100 entering the condenser vessel 151 is distributed through a manifold of conduits to each gas distributor.

As shown in FIG. 1, the condensed solution 154 returns to the regenerator 100 through a dipleg seal mechanism 157 which maintains a sufficient solution level 155 in the condenser vessel 151. The condenser vessel 151 is located at a slightly higher elevation above the regenerator 100 and the liquid head in the dip-leg balances the pressure difference between the regenerator and condenser vessel. The condensed solution stream 160 returns back to lower portion of the regenerator through nozzle 118. The condensed solution in vessel 151 can also be returned to regenerator nozzle 118 through conduit 158 and the condensate level 155 in the condenser vessel is maintained with a level control valve in conduit 158.

The $CO_2$ stream evolving through the condensed solution 154 enters the dipleg seal mechanism 157 in FIG. 1 tangentially and flows around a vortex finder 159. The cyclonic action of the stream around the vortex finder separates any entrained condensate (which then flows down along the wall to mix with the solution in the dipleg seal mechanism) and pure $CO_2$ stream 163 exits the condenser unit.

The ICLS regenerator 100 and the condenser unit 150 in FIG. 1 can be operated in either high or low pressure mode depending upon the characteristics of the solvent containing the precipitated solids. With aqueous ammonia solution as solvent, regeneration can be performed at higher pressures in the range of approximately of 200 to 500 psig by maintain backpressure and releasing $CO_2$ through a pressure control valve 162 in the pure $CO_2$ exit stream 163.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A system for regeneration of species removal media with precipitates comprising:
   a regenerator comprising:
   a process stream inlet for receiving a process stream comprising rich unwanted species containing precipitates;
   a downcomer standpipe column into which the process stream is directed;
   an internally circulating liquid stream of species removal media comprising chemical solvent; and
   a set of inverted bayonet tubes located inside of the regenerator and heated with a heat media, the heated set of inverted bayonet tubes transferring heat to the chemical solvent;
   an overflow system for recovering regenerated lean chemical solvent from an overflow arrangement and storing the regenerated chemical solvent in a lean chemical solvent surge tank;
   a cooling system to cool an exiting gas stream from the regenerator with the process stream, wherein the exiting gas stream is formed upon interaction of the process stream with a rich concentration of unwanted species and the internally circulating liquid stream; and
   a condenser for regenerating the chemical solvent.

2. The system of claim 1, wherein when the unwanted species is $CO_2$ contained in an effluent stream from a power plant, the system is configured to operationally remove at least 500,000 lbs/hr of $CO_2$ from the effluent stream, while also removing at least 90% of the $CO_2$ from the effluent stream.

3. The system of claim 1, wherein when the unwanted species is $CO_2$ contained in a syngas stream, the system is configured to operationally remove at least 500,000 lbs/hr of $CO_2$ from the syngas stream, while also removing at least 90% of the $CO_2$ from the syngas stream.

4. The system of claim 1, wherein an upper overflow section of the regenerator comprises an internal weir and a trough to collect regenerated chemical solvent overflowing the weir circumferentially.

5. The system of claim 1, wherein the process stream comprising unwanted species comprises a power plant effluent or syngas stream with a $CO_2$ concentration from about 15% to about 40%.

6. The system of claim 1, wherein an inlet section of the regenerator comprises:
   an inline mixer to mix the relatively cooler process stream with the exiting gas stream from the regenerator to form a mixed process stream;
   a funnel-shaped device to direct the mixed process stream to the downcomer standpipe column;
   a mixing system in the lower part of the downcomer standpipe column to mix the mixed process stream with the internally circulating liquid stream of chemical solvent; and
   a pumping system for pumping liquid stream of chemical solvent into the downcomer for increased internal liquid circulation requiring long residence time in staged regenerators.

7. The system of claim 6, wherein an upper portion of the funnel-shaped device has apertures for the evolving exiting gas stream to exit the regenerator.

8. The system of claim 1, wherein the condenser comprises:
   a bubbling distributor;
   a cooling coil bundle imbedded in a bubbling condensate liquid medium;
   a cyclonic separator to separate entrained liquid droplets; and
   a condensate dipleg to return condensate to the regenerator with a sealing mechanism.

9. The system of claim 8, wherein the vapor exiting the condenser is a substantially pure $CO_2$ gas stream.

10. The system of claim 1 further comprising a conduit concentrically located within the standpipe into which the inlet stream is directed.

11. The system of claim 10, wherein an annular region formed between the conduit and the standpipe presents a path for the internally circulating liquid stream of species removal media to flow.

12. A system for regeneration of species removal media with precipitates comprising:
   an absorber;
   a regenerator comprising:
   a process stream inlet for receiving a process stream comprising rich unwanted species containing precipitates exiting the absorber and a recuperative heat exchanger;
   a downcomer standpipe column into which the process stream is directed;
   an internally circulating liquid stream of species removal media comprising chemical solvent; and a set of inverted bayonet tubes heated with a heat media, the heated set of inverted bayonet tubes transferring heat to the chemical solvent;

an overflow system for recovering regenerated lean chemical solvent from an overflow arrangement and storing the regenerated chemical solvent in a lean chemical solvent surge tank;

a cooling system to cool an exiting gas stream from the regenerator with the relatively cooler process stream from the absorber, wherein the exiting gas stream is formed upon interaction of the process stream with a rich concentration of unwanted species and the internally circulating liquid stream; and a condenser for regenerating the chemical solvent comprising:
- a bubbling distributor;
- a cooling coil bundle imbedded in a bubbling condensate liquid medium;
- a cyclonic separator to separate entrained liquid droplets; and
- a condensate dipleg to return condensate to the regenerator with a sealing mechanism.

13. The system of claim 12, wherein the vapor exiting the condenser is a substantially pure $CO_2$ gas stream.

14. The system of claim 12 further comprising means for operationally removing a mass flow of the unwanted species, wherein when the unwanted species is $CO_2$ contained in an effluent stream from a power plant, the system operationally removes at least 500,000 lbs/hr of $CO_2$ from the effluent stream, while also removing at least 90% of the $CO_2$ from the effluent stream.

15. The system of claim 12 further comprising means for operationally removing a mass flow of the unwanted species, wherein when the unwanted species is $CO_2$ contained in a syngas stream, the system operationally removes at least 500,000 lbs/hr of $CO_2$ from the syngas stream, while also removing at least 90% of the $CO_2$ from the syngas stream.

16. The system of claim 12, wherein an upper overflow section of the regenerator comprises an internal weir and a trough to collect regenerated chemical solvent overflowing the weir circumferentially.

17. The system of claim 12, wherein the process stream comprising unwanted species comprises a power plant effluent or syngas stream with a $CO_2$ concentration from about 15% to about 40%.

18. The system of claim 12, wherein the heat media comprises steam.

19. The system of claim 12, wherein an inlet section of the regenerator comprises:
- an inline mixer to mix the relatively cooler process stream with the exiting gas stream from the regenerator to form a mixed process stream;
- a funnel-shaped device to direct the mixed process stream to the downcomer standpipe column;
- a mixing system in the lower part of the downcomer standpipe column to mix the mixed process stream with the internally circulating liquid stream of chemical solvent; and
- a pumping system for pumping liquid stream of chemical solvent into the downcomer for increased internal liquid circulation requiring long residence time in staged regenerators.

20. The system of claim 19, wherein an upper portion of the funnel-shaped device has apertures for the evolving exiting gas stream to exit the regenerator.

* * * * *